United States Patent
Tanabe et al.

(10) Patent No.: US 7,586,483 B2
(45) Date of Patent: Sep. 8, 2009

(54) TOUCH PANEL

(75) Inventors: Koji Tanabe, Kantano (JP); Shoji Fujii, Ibaraki (JP)

(73) Assignee: Panasonic Corporation, Osaka (JP)

( * ) Notice: Subject to any disclaimer, the term of this patent is extended or adjusted under 35 U.S.C. 154(b) by 737 days.

(21) Appl. No.: 11/289,618

(22) Filed: Nov. 30, 2005

(65) Prior Publication Data
US 2006/0152640 A1  Jul. 13, 2006

(30) Foreign Application Priority Data

Jan. 11, 2005 (JP) .............................. 2005-003575

(51) Int. Cl.
G06F 3/41 (2006.01)
(52) U.S. Cl. ....................... 345/173; 345/179
(58) Field of Classification Search ............. 345/1.1, 345/76, 87, 88, 96, 102, 107, 156, 173, 178; 200/600; 349/12, 150, 67, 96, 58; 428/455, 428/408, 402, 195.1, 220, 209, 419, 106
See application file for complete search history.

(56) References Cited

U.S. PATENT DOCUMENTS

| | | | | |
|---|---|---|---|---|
| 4,697,885 A | * | 10/1987 | Minowa et al. | 349/149 |
| 5,103,336 A | * | 4/1992 | Sieloff | 359/253 |
| 5,239,152 A | * | 8/1993 | Caldwell et al. | 200/600 |
| 5,583,768 A | * | 12/1996 | Hamajima et al. | 701/53 |
| 6,606,193 B2 | * | 8/2003 | Umemoto | 359/497 |
| 7,410,825 B2 | * | 8/2008 | Majumdar et al. | 438/106 |
| 7,414,313 B2 | * | 8/2008 | Majumdar et al. | 257/741 |
| 7,427,441 B2 | * | 9/2008 | Majumdar et al. | 428/419 |
| 2003/0053011 A1 | * | 3/2003 | Mori | 349/96 |
| 2004/0191509 A1 | | 9/2004 | Kishioka et al. | 428/354 |
| 2004/0239641 A1 | | 12/2004 | Takahata et al. | 345/173 |
| 2006/0007171 A1 | * | 1/2006 | Burdi et al. | 345/173 |
| 2006/0062975 A1 | * | 3/2006 | Majumdar et al. | 428/209 |
| 2006/0062983 A1 | * | 3/2006 | Irvin et al. | 428/220 |
| 2006/0088698 A1 | * | 4/2006 | Majumdar et al. | 428/195.1 |
| 2006/0110549 A1 | * | 5/2006 | Wang et al. | 428/1.3 |
| 2006/0131703 A1 | * | 6/2006 | Majumdar et al. | 257/665 |
| 2006/0144514 A1 | * | 7/2006 | Wang et al. | 156/324 |
| 2007/0273672 A1 | * | 11/2007 | Hong | 345/173 |

FOREIGN PATENT DOCUMENTS

JP    2002-297319    10/2002

* cited by examiner

Primary Examiner—Prabodh M Dharia
(74) Attorney, Agent, or Firm—Steptoe & Johnson LLP

(57) ABSTRACT

A touch panel is equipped with a light-transmissive upper substrate, a light-transmissive lower substrate, a polarizing plate bonded onto a top surface of the upper substrate, and a light-transmissive adhesive layer containing acid acceptors. A lower surface of the upper substrate is formed thereon with an upper conductive layer, and a top surface of the lower substrate is formed thereon with a lower conductive layer facing the upper conductive layer, with a certain air gap provided. The polarizing plate has a polarizer and a triacetylcellulose film bonded onto both surfaces of the polarizer. The adhesive layer bonds at least one of the polarizer with the triacetylcellulose film and the upper substrate with the polarizing plate. This makeup provides the touch panel with favorable visibility and easy operability.

5 Claims, 3 Drawing Sheets

TOUCH PANEL

BACKGROUND OF THE INVENTION

1. Field of the Invention

The present invention relates to a touch panel used for operating various types of electronic devices.

2. Background Art

In recent years, various types of electronic devices such as a mobile phone and car navigation system, with their higher functionality and diversification proceeding, have been increasingly equipped with a light-transmissive touch panel on the front surface of their display element such as a liquid crystal screen. A user of the device selects each function of the device by pressing the touch panel with a finger, dedicated pen, or the like, while viewing the display on the display element on the back surface through this touch panel. Such a touch panel is demanded that provides reliable operation with high visibility.

A description is made for the conventional touch panel, using FIG. 6.

FIG. 6 is a sectional view of the conventional touch panel. In FIG. 6, upper substrate 51 is film-like and formed with light-transmissive polycarbonate or the like. Lower substrate 52 is light-transmissive as well. A lower surface of upper substrate 51 is formed thereon with light-transmissive upper conductive layer 53 made of a material such as indium tin oxide. A top surface of lower substrate 52 is formed thereon with light-transmissive lower conductive layer 54 made of a material such as indium tin oxide.

Further, a top surface of lower conductive layer 54 is formed thereon with a plurality of dot spacers (not illustrated) made of insulating resin at certain intervals. Additionally, both ends of upper conductive layer 53 are formed thereon with a pair of upper electrodes (not illustrated). Both ends of lower conductive layer 54 are formed thereon with a pair of lower electrodes (not illustrated) orthogonally to the upper electrodes.

Top and lower surfaces of frame-like spacer 55 are coated and formed thereon with an adhesive layer (not illustrated). This adhesive layer bonds respective outer sides of upper substrate 51 and lower substrate 52. In this way, upper conductive layer 53 and lower conductive layer 54 are arranged facing each other with a certain gap provided.

Further, polarizer 56A is made from iodine and dye oriented in polyvinyl alcohol. Top and lower surfaces of polarizer 56A are interposed between and bonded by triacetylcellulose film 56B (hereinafter referred to as "TAC film 56B") to form polarizing plate 56. Polarizing plate 56 is bonded onto the top surface of upper substrate 51 to compose touch panel 50.

Touch panel 50 composed in this way is arranged on a front surface of a liquid crystal display element or the like (not illustrated) to be attached to an electronic device. Further, the pair of upper electrodes and the pair of lower electrodes are respectively connected to an electronic circuit (not illustrated) of the device.

While display on the liquid crystal display element on a back surface of touch panel 50 being viewed, the top surface of polarizing plate 56 is pressed with a finger, pen, or the like. Consequently, upper substrate 51 deforms along with polarizing plate 56, causing upper conductive layer 53 corresponding to a position having been pressed to contact lower conductive layer 54.

Then, a voltage is applied sequentially to the upper and the lower electrodes from the electronic circuit. The electronic circuit detects a position having been pressed using a voltage ratio between these electrodes, selecting various functions of the device.

Meanwhile, external light such as sunlight and lamplight, emitted from above touch panel 50 transmits through polarizing plate 56. When external light transmits, light waves in direction X and direction Y, orthogonal to direction X, become linearly-polarized light in either of the two directions, owing to polarizing plate 56. Then, this linearly-polarized light enters into upper substrate 51.

The incident light transmitting through upper substrate 51 reflects upward on lower conductive layer 54. However, the amount of the reflected light is reduced roughly by half due to polarization when transmitting through polarizing plate 56. Consequently, a small amount of reflected light emerges from the top surface of polarizing plate 56. That is to say, the liquid crystal display element or the like on the back surface of touch panel 50 with polarizing plate 56 affords higher visibility.

Conventional touch panel 50 is disclosed in Japanese Patent Unexamined Publication No. 2002-297319, for example.

SUMMARY OF THE INVENTION

A touch panel according to the present invention has a light-transmissive upper substrate, a light-transmissive lower substrate, a polarizing plate bonded onto a top surface of the upper substrate, and a light-transmissive adhesive layer containing acid acceptors. A lower surface of the upper substrate is formed thereon with an upper conductive layer. A top surface of the lower substrate is formed thereon with a lower conductive layer facing the upper conductive layer with a certain air gap provided. The polarizing plate has a polarizer and a triacetylcellulose film bonded onto both surfaces of the polarizer. The adhesive layer bonds at least one of the polarizer with the triacetylcellulose film and the upper substrate with the polarizing plate. This makeup provides a touch panel with favorable visibility and easy operability.

DETAILED DESCRIPTION OF THE INVENTION

Hereinafter, a description is made for an embodiment of the present invention, using FIGS. 1 through 5.

EMBODIMENT

Figure 1:
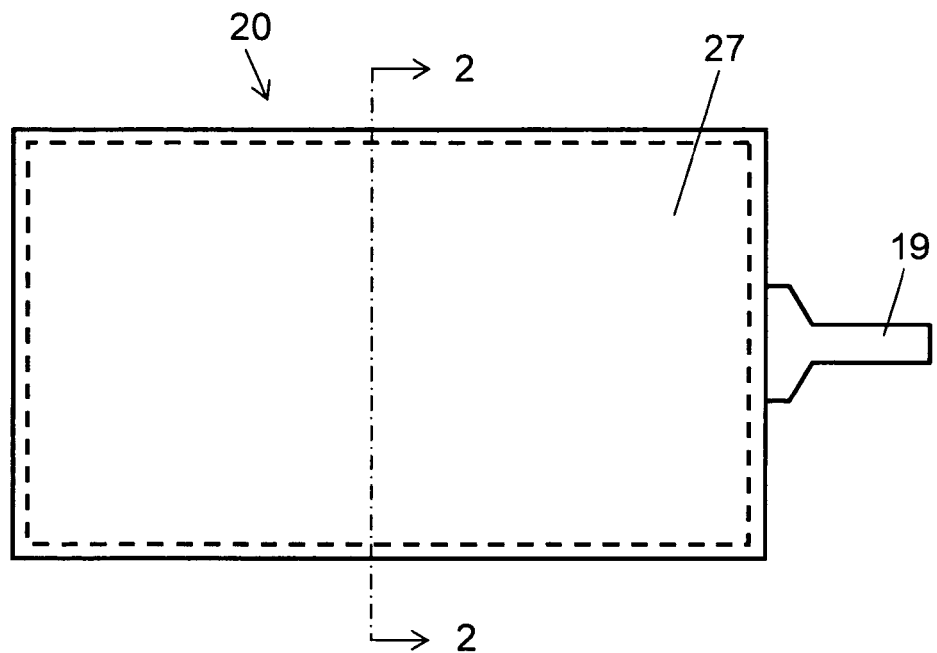
FIG. 1 is a plan view of a touch panel according to an embodiment of the present invention.
Figure 2:
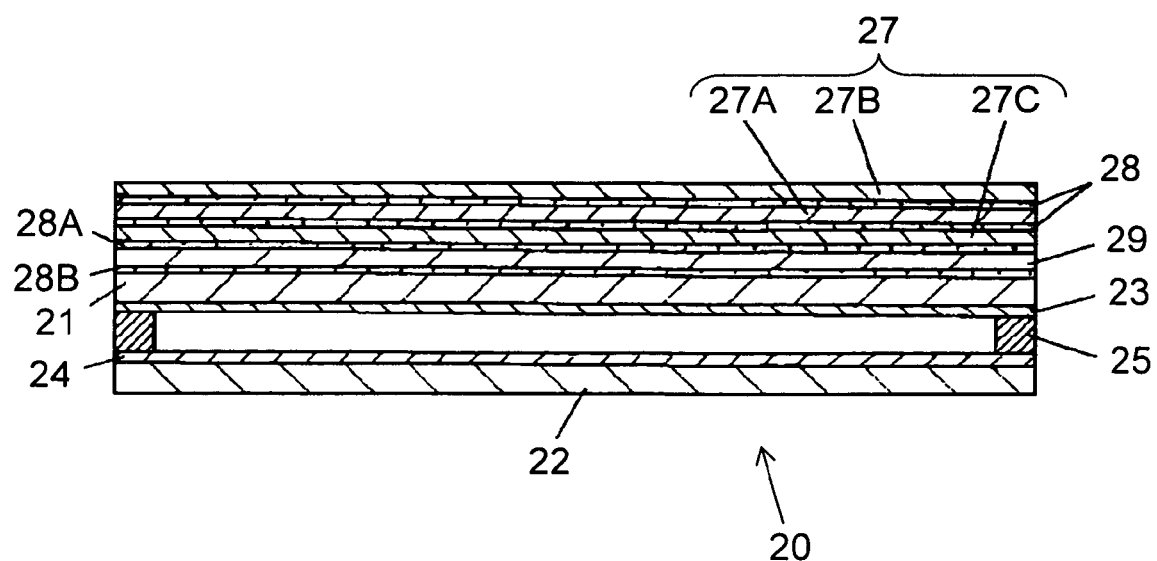
FIG. 2 is a sectional view of the touch panel shown in FIG. 1, taken along line 2-2.

FIG. 1 is a plan view of a touch panel according to an embodiment of the present invention. FIG. 2 is a sectional view of the touch panel shown in FIG. 1, taken along line 2-2. In FIGS. 1 and 2, upper substrate 21, film-like and light-transmissive, is formed with an optically isotropic material such as polycarbonate or polyethersulfone resin. Light-transmissive lower substrate 22 is formed with an optically isotropic material such as glass or polycarbonate resin. A lower surface of upper substrate 21 is formed thereon with light-transmissive upper conductive layer 23 made of a material such as indium tin oxide or tin oxide. A top surface of lower substrate 22 is also formed thereon with light-transmissive lower conductive layer 24 made of a material such as indium tin oxide or tin oxide. Upper conductive layer 23 and lower conductive layer 24 are formed by a process of sputtering or the like.

A top surface of lower conductive layer 24 is formed thereon with a plurality of dot spacers (not illustrated) made of insulating resin such as epoxy or silicon at certain intervals. Further, both ends of upper conductive layer 23 are formed thereon with a pair of upper electrodes (not illustrated) made of silver or carbon. Meanwhile, both ends of lower conductive layer 24 are formed thereon with a pair of lower electrodes (not illustrated) orthogonally to the upper electrodes.

Wiring board 19 is film-like with a material such as polyethylene terephthalate or polycarbonate. Top and lower surfaces of wiring board 19 are formed thereon with a plurality of wiring patterns (not illustrated) with a material such as silver, carbon, or copper foil. Each one end of these wiring patterns is connected to the upper electrode, the lower electrode, or the like.

Frame-like spacer 25 is formed with a material such as nonwoven fabric or polyester film. A bonding layer (not illustrated) coated and formed on the top and lower surfaces of spacer 25 with a material such as acrylic or rubber bonds the outer parts of upper substrate 21 and lower substrate 22 together. In this way, upper conductive layer 23 and lower conductive layer 24 are arranged facing each other with a certain gap provided. Here, "frame-like" refers to a frame with only its outer part formed having a polygonal shape such as quadrangle.

Additionally, polarizer 27A is made from iodine and dye which are adsorbed, extended, and oriented in polyvinyl alcohol. Both top and lower surfaces of polarizer 27A are interposed between triacetylcellulose films 27B and 27C (hereinafter referred to as "TAC films 27B and 27C") to form polarizing plate 27. Still, polarizing plate 27 is placed on and bonded to the top surface of upper substrate 21.

The top and lower surfaces of polarizer 27A are coated with light-transmissive adhesive layer 28 (hereinafter referred to as "adhesive layer 28") composing an adhesive layer. Both of top and lower surfaces of polarizer 27A are bonded by adhesive layer 28 to TAC films 27B and 27C respectively.

Meanwhile, retardation plate 29 is a quarter wave plate. Retardation plate 29 is formed by a film such as polycarbonate or cyclo-olefin polymer extended and added birefringence characteristics. Retardation plate 29 has flexibility as well. Top and lower surfaces of retardation plate 29 are coated with light-transmissive second adhesive layer 28A (hereinafter referred to as "adhesive layer 28A") and light-transmissive third adhesive layer 28B (hereinafter referred to as "adhesive layer 28B") respectively. Both adhesive layer 28A and adhesive layer 28B are formed with acrylic, polystyrene, vinyl acetate resin, or the like, containing acid acceptors. Both adhesive layer 28A and adhesive layer 28B compose adhesive layers. Retardation plate 29 is bonded by adhesive layer 28B onto the top surface of upper substrate 21. Retardation plate 29 is bonded by adhesive layer 28A onto polarizing plate 27. That is to say, retardation plate 29 is bonded between the top surface of upper substrate 21 and polarizing plate 27 through adhesive layers 28A and 28B. Touch panel 20 is thus composed.

Adhesive layers 28, 28A, and 28B are composed with polyvinyl alcohol resin containing acid acceptors by 0.2% to 25% by weight, for example. Acid acceptors to be contained may be, for example, hydrotalcite $(Mg_6Al_2(OH)_{16}CO_3 \cdot 4H_2O)$ or acrylate fiber powder absorptive of acetic acid.

Touch panel 20 is arranged on a front surface of a liquid crystal display element or the like (not illustrated) to be attached to an electronic device (not illustrated). Further, the pair of upper electrodes and the pair of lower electrodes are connected to an electronic circuit (not illustrated) of the device through wiring board 19.

In the above-mentioned makeup, while the display on the liquid crystal display element on a back surface of touch panel 20 being viewed, the top surface of polarizing plate 27 is pressed with a finger, pen, or the like. Consequently, upper substrate 21 deforms along with both polarizing plate 27 and retardation plate 29, causing upper conductive layer 23 corresponding to a position having been pressed to touch lower conductive layer 24.

Then, a voltage is applied sequentially to the upper and the lower electrodes from the electronic circuit. The electronic circuit detects a position having been pressed using the voltage ratio between these electrodes, selecting various functions of the device.

Meanwhile, external light such as sunlight and lamplight, emitted from above touch panel 20, enters into retardation plate 29 transmitting through polarizing plate 27. When the incidence light transmits through polarizing plate 27, absorptive of light wave in direction Y, the light enters retardation plate 29 from polarizing plate 27 as linearly polarized light in direction X, out of light wave in direction X and direction Y, orthogonal to direction X. Here, light wave absorbed by polarizing plate 27 is not limited to one in direction Y, but it may be one in direction X, for example.

Next, the light that has entered retardation plate 29 is polarized from linearly-polarized light to circularly polarized light by transmitting through retardation plate 29, and reflects upward on the surface of lower conductive layer 24.

Then, the light that has reflected on the surface of lower conductive layer 24 transmits through retardation plate 29 again. Consequently, the light enters polarizing plate 27 as linearly polarized light in direction Y by half wave out of phase. The linearly polarized light in direction Y is cut off by polarizing plate 27, which has a property of transmitting only light wave in direction X.

That is to say, external light that has entered into touch panel 20 from above touch panel 20 reflects upward at lower conductive layer 24. However, the reflected light is cut off by polarizing plate 27 and does not emerge from the top surface of polarizing plate 27. This makeup prevents light from reflecting to an operating surface, to bring favorable visibility of the liquid crystal display element or the like provided on the back surface of touch panel 20.

Meanwhile, polarizer 27A is boned to TAC films 27B and 27C with adhesive layer 28. Polarizing plate 27 is boned to retardation plate 29 with adhesive layer 28A. If touch panel 20 is used in an environment with high temperature and high humidity, at 85° C. and 85% RH, for example, TAC films 27B and 27C may be hydrolyzed to generate acetic acid. However, the lower surface of TAC film 27B, and the top and the lower surfaces of TAC film 7C are covered with adhesive layers 28 and 28A, containing acid acceptors, respectively. Consequently, the acid acceptors in adhesive layers 28 and 28A absorb acetic acid generated in TAC films 27B and 27C, to prevent TAC films 27B and 27C from being hydrolyzed. As a result, discoloration and deterioration of TAC films 27B and 27C are suppressed to provide touch panel 20 with favorable visibility and easy operability.

The percentage of acid acceptors contained in adhesive layers 28 and 28A is 0.2% to 25%, more preferably 1% to 5%, by weight. This percentage effectively suppresses hydrolysis of TAC films 27B and 27C, and thus discoloration and deterioration. Still, adhesive layers 28 and 28A have a favorable bonding characteristic without degradation in adhesiveness, to bond and retain each component reliably.

The above description is made for a makeup in which adhesive layer 28 on the top and the lower surfaces of polarizer 27A, and adhesive layers 28A and 28B on the top and the lower surfaces of retardation plate 29 all contain acid acceptors. However, acid acceptors may be contained only in adhesive layer 28 on the top and the lower surfaces of polarizer 27A, only in adhesive layer 28 on the top surface of polarizer 27A and adhesive layer 28A on the top surface of retardation plate 29, or only in any one of these.

Figure 3:
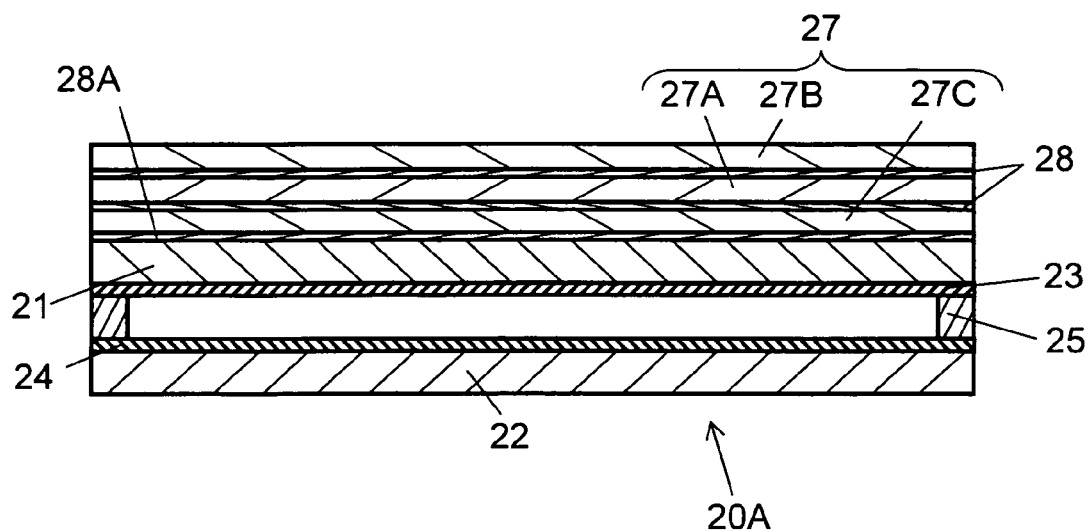
FIG. 3 is a sectional view of a touch panel according to another embodiment of the present invention.

Furthermore, as shown in FIG. 3, touch panel 20A may be one without retardation plate 29 and adhesive layer 28B. Adhesive layer 28 or 28A containing acid acceptors prevents TAC films 27B and 27C to be hydrolyzed, and thus discoloration and deterioration.

The description is made for a case where acid acceptors contained in adhesive layers 28, 28A, and 28B, are those such as hydrotalcite or acrylate fiber powder. Hydrotalcite with its refractive index of 1.5 and acrylate fiber powder or the like with its refractive index of 1.45 have a refractive index approximate with polycarbonate, polyethersulfone resin, and the like, used for upper substrate 21, lower substrate 22, and retardation plate 29. However, acid acceptors may use another material as long as it has a refractive index of 1.4 to 1.6, which remains the light transmittance state.

Figure 4:
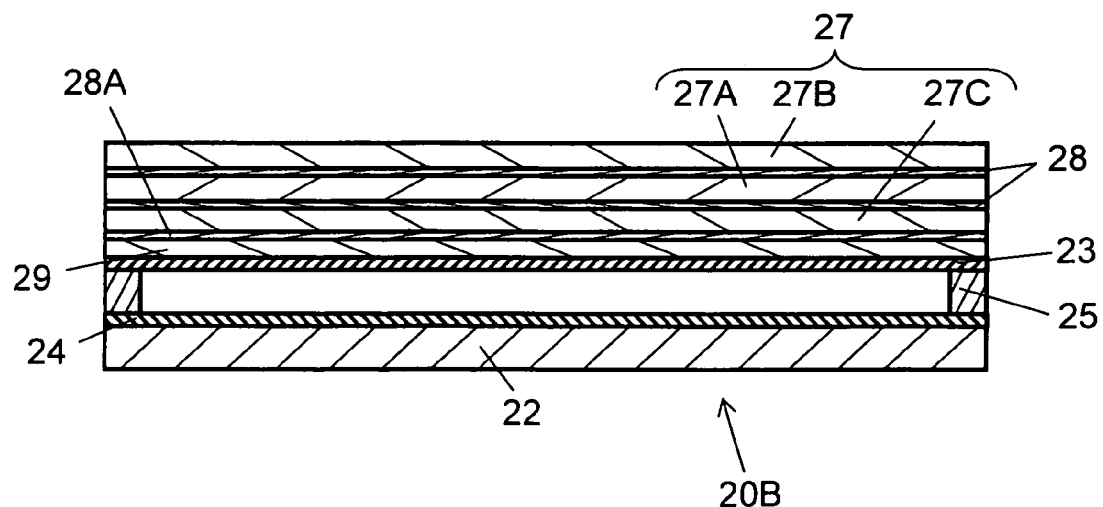
FIG. 4 is a sectional view of a touch panel according to still another embodiment of the present invention.

Further, as shown in FIG. 4, upper conductive layer 23, instead of upper substrate 21, may be directly formed on the lower surface of retardation plate 29 and may be arranged facing lower conductive layer 4 with a certain gap provided. This makeup provides touch panel 20B removing upper substrate 21 and adhesive layer 28B, with a small number of components and low cost.

Figure 5:
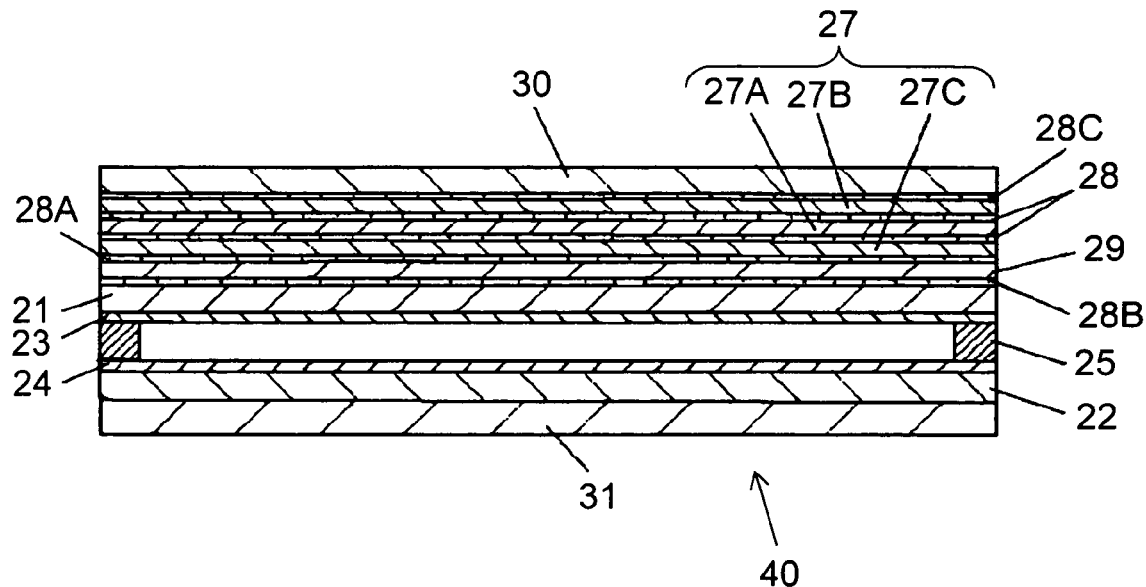
FIG. 5 is a sectional view of a touch panel according to yet another embodiment of the present invention.
Figure 6:
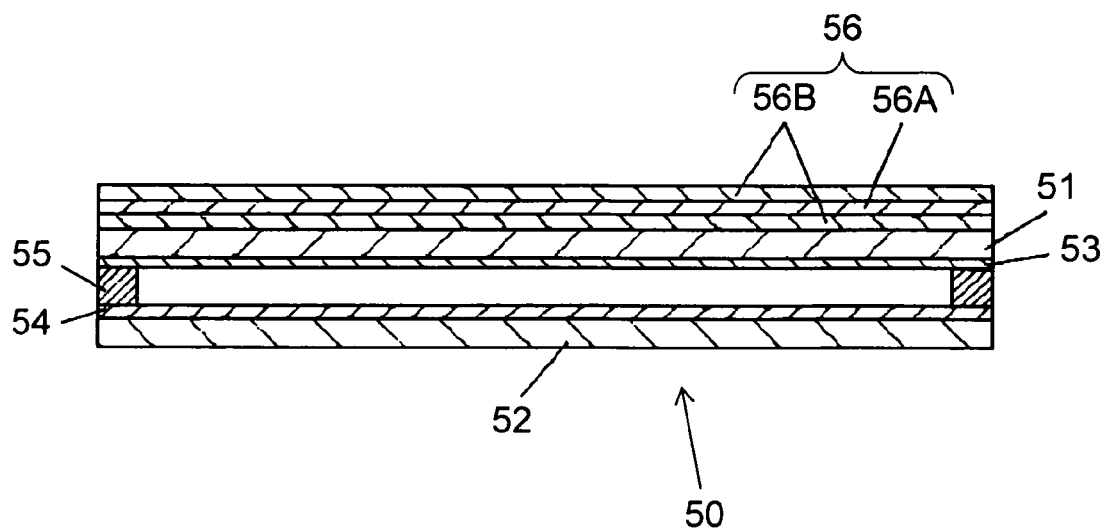
FIG. 6 is a sectional view of the conventional touch panel.

Still, as shown in FIG. 5, in touch panel 40, light-transmissive cover sheet 30 may be bonded with light-transmissive fourth adhesive layer 28C (hereinafter referred to as "adhesive layer 28C") on the top surface of polarizing plate 27. Adhesive layer 28C contains acid acceptors and composes an adhesive layer. This makeup allows a top surface of TAC film 27B to be covered with cover sheet 30, preventing moisture from entering TAC film 27B. Additionally, both the top and the lower surfaces of TAC film 27B are covered with adhesive layers 28 and 28C, thus effectively preventing TAC film 27B from being hydrolyzed. Consequently, discoloration and deterioration of TAC film 27B are more reliably prevented.

Here, cover sheet 30 is formed with polycarbonate with its heat shrinkage ratio of approximately 0.01%, polyethersulfone resin with approximately 0.02%, or the like, after being left for 24 hours at 85° C., in the same way as in upper substrate 21. Additionally, interposing the top and the lower surfaces of polarizing plate 27 with its heat shrinkage ratio of around 0.5%, between cover sheet 30 and upper substrate 21 prevents polarizing plate 27 from being warped in an environment with high temperature and high humidity. This makeup stabilizes the operability of touch panel 40.

Further, as shown in FIG. 5, the lower surface of lower substrate 22 is bonded thereon with retardation plate 31 composed in the same way as in retardation plate 29. Then the lamplight from a liquid crystal display element or the like arranged on the back surface of touch panel 40 is assumed to be linearly polarized light in direction Y, for example. Consequently, the lamplight from the display element retardation plate 31, which is a quarter wave plate, at first. Next, the lamplight transmitting through retardation plate 31 transmits through retardation plate 29, which is a quarter wave plate also. As a result, the lamplight transmitting through retardation plate 31 and 29 is polarized to linearly polarized light in direction X by half wave out of phase, to enter polarizing plate 27. The light further transmits through polarizing plate 27 to emerge from the top surface of cover sheet 30, which is an operating surface.

That is to say, the lamplight from the liquid crystal display element or the like, by transmitting through retardation plate 31 and retardation plate 29, becomes linearly polarized light in direction X, to emerge from the top surface of cover sheet 30 only by half wave out of phase. Accordingly, not only that the reflection of external light from above is prevented as mentioned above, but the display on the liquid crystal display element or the like on the back surface of touch panel 40 is clearly viewed.

What is claimed is:

1. A touch panel comprising:
   a light-transmissive upper substrate having an upper conductive layer on a lower surface thereof;
   a light-transmissive lower substrate having a lower conductive layer on a top surface thereof, the lower conductive layer facing the upper conductive layer, the upper and lower conductive layers having an air gap therebetween;
   a polarizing plate bonded onto a top surface of the upper substrate and including a polarizer and a triacetylcellulose film bonded onto opposite surfaces of the polarizer; and
   a light-transmissive adhesive bonding at least one of (1) the polarizer with the triacetylcellulose film and (2) the upper substrate with the polarizing plate, the light-transmissive adhesive including acid acceptors.

2. The touch panel as claimed in claim 1, wherein the acid acceptors are 0.2% to 25% by weight of the adhesive layer.

3. The touch panel as claimed in claim 1, further comprising a retardation plate bonded between a top surface of the upper substrate and the polarizing plate.

4. The touch panel as claimed in claim 1, further comprising a light-transmissive cover sheet bonded onto a top surface of the polarizing plate.

5. The touch panel as claimed in claim 1, wherein the acid acceptors include hydrotalcite or acrylate fiber powder.

* * * * *